United States Patent
Ye et al.

(10) Patent No.: US 7,839,638 B2
(45) Date of Patent: Nov. 23, 2010

(54) POWER SUPPLY ASSEMBLY

(75) Inventors: Zhen-Xing Ye, Shenzhen (CN); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/417,611

(22) Filed: Apr. 2, 2009

(65) Prior Publication Data

US 2010/0208426 A1     Aug. 19, 2010

(30) Foreign Application Priority Data

Feb. 17, 2009    (CN) .................. 2009 1 0300440

(51) Int. Cl.
*H05K 7/20*    (2006.01)
(52) U.S. Cl. ............. 361/695; 361/694; 415/213.1; 415/214.1; 454/184
(58) Field of Classification Search ........... 361/679.46, 361/679.48, 679.49, 694, 695; 454/184; 415/213.1, 214.1
See application file for complete search history.

(56) References Cited

U.S. PATENT DOCUMENTS

| | | | |
|---|---|---|---|
| 6,186,889 B1 * | 2/2001 | Byrne | 454/184 |
| 6,304,443 B1 * | 10/2001 | Chou | 361/695 |
| 6,435,889 B1 * | 8/2002 | Vinson et al. | 439/247 |
| 6,515,858 B2 * | 2/2003 | Rodriguez et al. | 361/695 |
| 6,592,327 B2 * | 7/2003 | Chen et al. | 415/213.1 |
| 6,667,882 B2 * | 12/2003 | Pauser | 361/695 |
| 7,713,025 B2 * | 5/2010 | Chen et al. | 415/213.1 |
| 2003/0099094 A1 * | 5/2003 | Coles et al. | 361/726 |
| 2006/0133034 A1 * | 6/2006 | Lee | 361/695 |
| 2007/0121290 A1 * | 5/2007 | Chou et al. | 361/695 |
| 2009/0059521 A1 * | 3/2009 | Yin | 361/695 |
| 2009/0284919 A1 * | 11/2009 | Tao et al. | 361/695 |

* cited by examiner

*Primary Examiner*—Gregory D Thompson
(74) *Attorney, Agent, or Firm*—Zhigang Ma

(57) ABSTRACT

A power supply assembly includes two brackets, a fan detachably mounted between the brackets, and a main body. Each bracket includes an elastic member extending from an end of the bracket. The main body includes a receiving space, and two opposite mounting walls bounding the receiving space. The brackets together with the fan can be detachably mounted to the main body via being received in the receiving space and the elastic members engaging with the mounting walls.

16 Claims, 2 Drawing Sheets

POWER SUPPLY ASSEMBLY

BACKGROUND

1. Technical Field

The disclosure relates to power supply assemblies and, particularly, to a power supply assembly for a computer.

2. Description of Related Art

In a traditional power supply of a computer, a fan is accommodated and fixed in a shell of the power supply. However, when the fan is broken or damaged, it is inconveniently to replace or service the fan.

DETAILED DESCRIPTION

Figure 1:
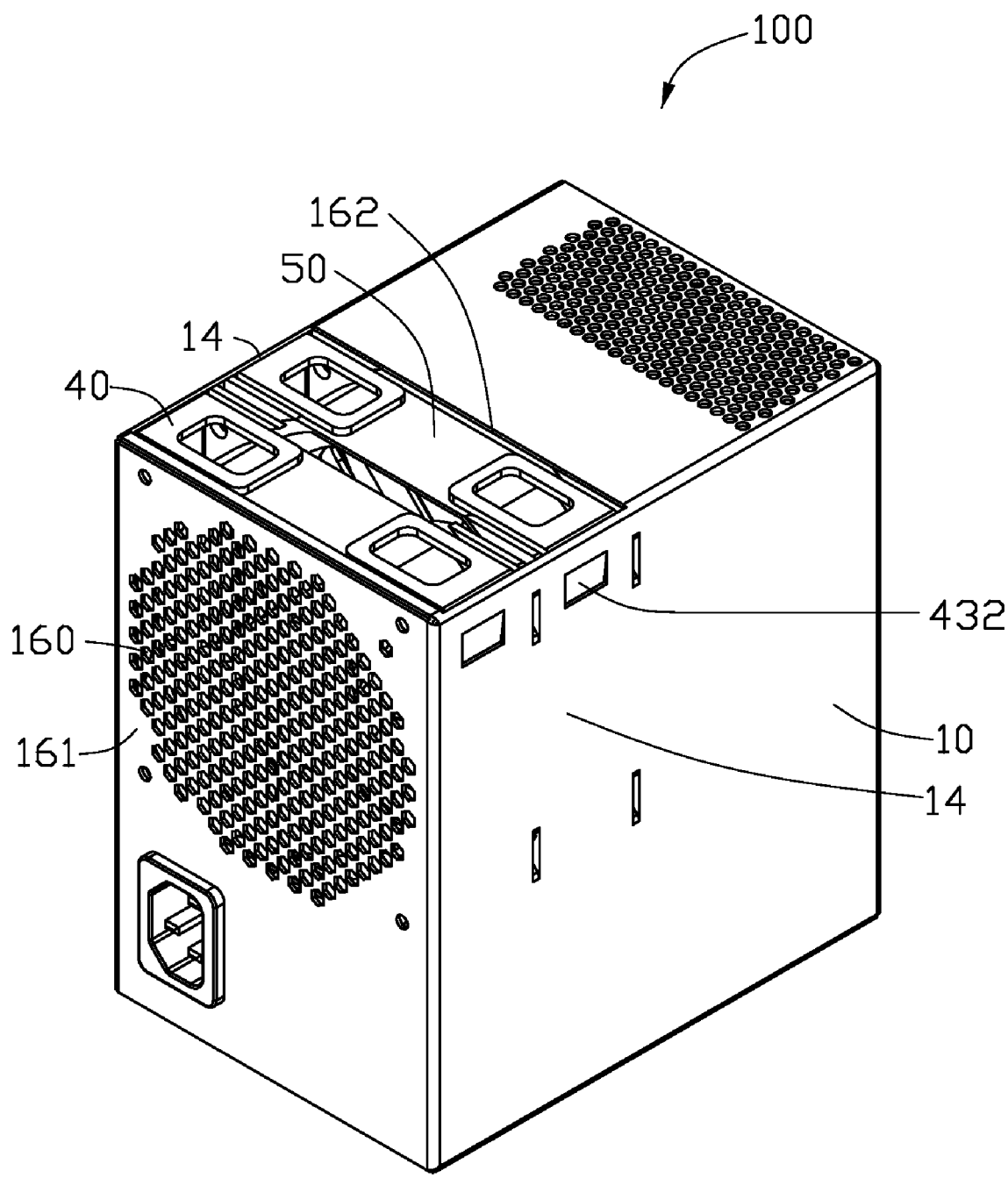
FIG. 1 is an isometric view of an exemplary embodiment of a power supply assembly, the power supply having a main body.
Figure 2:
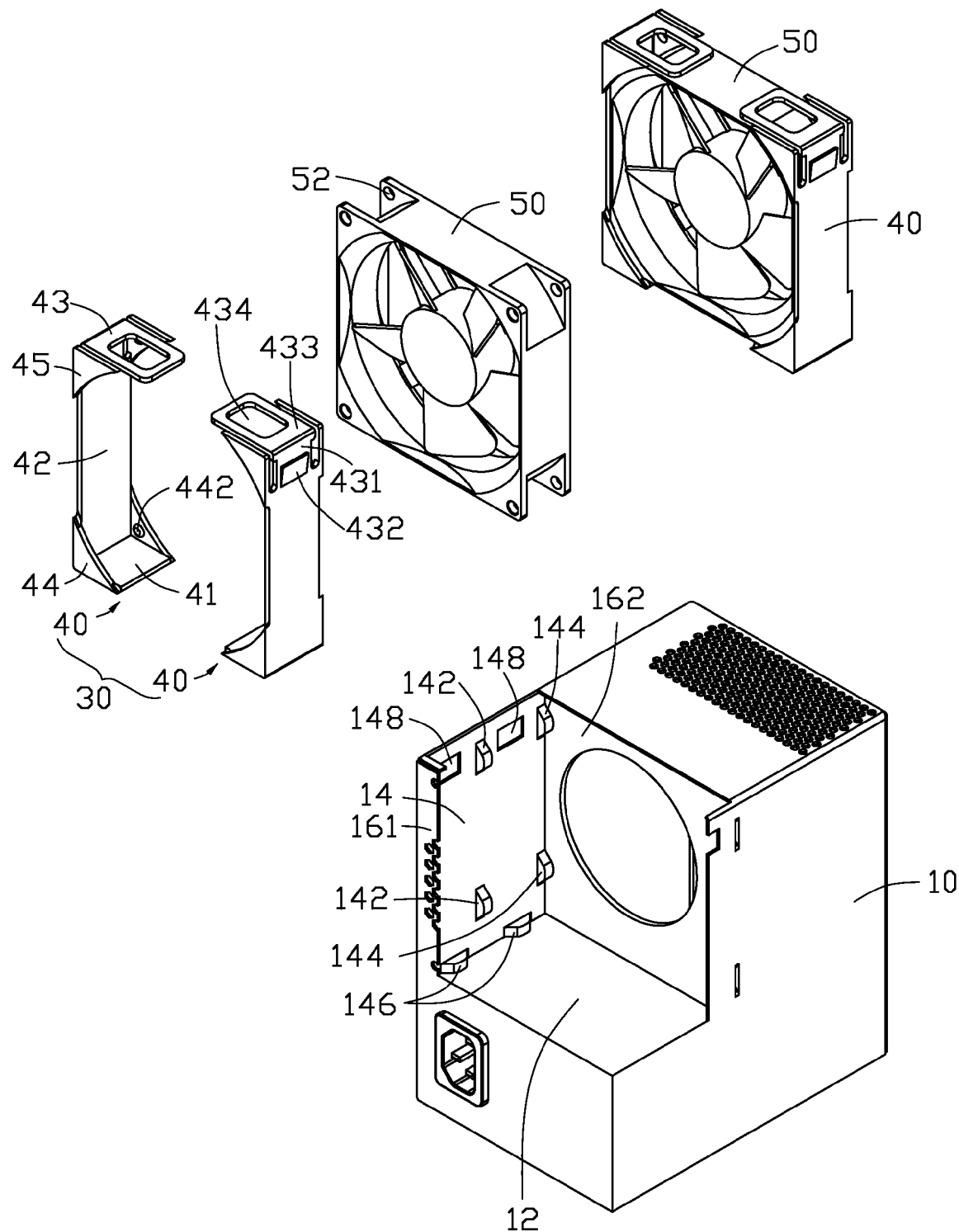
FIG. 2 is an exploded, isometric view of the power supply assembly of FIG. 1, with the main body being partly cutaway.

Referring to FIGS. 1 and 2, an embodiment of a power supply assembly 100 is used to supply power for a computer. The power supply assembly 100 includes a main body 10, two fans 50, and two fan mounts 30.

The main body 10 defines a receiving space 12 in an upper part of a rear portion of the main body 10, for receiving the fans 50. The receiving space 12 is cooperatively bounded by a base (not labeled), two mounting walls 14 extending from two opposite sides of the base, and two air-through walls 161 and 162 extending from the other two opposite sides of the base and perpendicularly connecting corresponding sides of the mounting walls 14. The air-through wall 161 defines a plurality of holes 160 for air passing through. The air-through wall 162 defines a round opening (not labeled) corresponding to the fans 50. Each mounting wall 14 includes a column of first projections 142 extending inward from a middle of the corresponding mounting wall 14, and a column of second projections 144 extending inward from the corresponding mounting wall 14 adjacent to the air-through wall 162. Here, a number of the column of first projections 142 is two, and a number of the column of second projections 144 is two. Two latching holes 148 are defined in each mounting wall 14 adjacent a top side of the corresponding mounting wall 14. One of the latching holes 148 is located between the first projection 142 and the corresponding second projection 144 of the corresponding mounting wall 14, the other one of the latching holes 148 is located between the first projection 142 of the corresponding mounting wall 14 and the air-through wall 161. Two projections 146 extend from each mounting wall 14 adjacent to the base. The projections 146 are located aligned with and below the corresponding latching holes 148, respectively.

Four corners of each fan 50 define four pairs of mounting holes 52.

Each fan mount 30 includes two approximately n-shaped brackets 40. As an example, one of the brackets 40 is described hereinafter in the present paragraph. The bracket 40 includes an approximately square first piece 41, and a rectangular second piece 42 perpendicularly extending from a side of the first piece 41. An L-shaped elastic member 43 extends from an end of the second piece 42 opposite to the first piece 41. The elastic member 43 includes a first part 431 aligning with the second piece 42 and a second part 433 perpendicularly extending from the first part 431. A wedge-shaped raised portion extends from an outer side of the first part 431 of the elastic member 43 to form a latching portion 432. A hole 434 is defined in the second part 433 of the elastic member 43. The bracket 40 further includes a pair of triangular first locating pieces 44, and a pair of triangular second locating pieces 45. The pair of first locating pieces 44 perpendicularly connect and sandwich the first piece 41 and the second piece 42. The pair of second locating pieces 45 extend perpendicularly from the second piece 42 and are located at opposite sides of the elastic member 43.

In assembly, each fan 50 is mounted between two brackets 40 of one of the fan mounts 30. Each fan 50 is sandwiched between the pairs of first locating pieces 44 and the pairs of second locating pieces 45 of a corresponding bracket 40. Left and right sides of each fan 50 abut against the second pieces 42. A lower side of each fan 50 abuts against the first pieces 41. An upper side of each fan 50 abuts against the second parts 433 of the elastic members 43. The assembled fans 50 and the corresponding fan mounts 30 are inserted into the receiving space 12 of the main body 10. One of the fan mounts 30 is sandwiched between the column of first projections 142 and the column of second projections 144, the other one of the fan mounts 30 is sandwiched between the column of first projections 142 and the air-through wall 161. The pair of first pieces 41 of each fan mount 30 abuts against two corresponding projections 146. The latching portions 432 of the fan mounts 30 are engaged in the corresponding latching holes 148. Wherein before the latching portions 432 engaging in the latching holes 148, the latching portions 432 need to engage with inner sides of corresponding mounting walls 14 to deform the elastic members 43, until the latching portions 432 slide into the receiving space 12.

In disassembly, an operator can insert fingers into the holes 434 of one of the fan mounts 30, and pull the elastic members 43 toward each other. The elastic members 43 of the fan mount 30 are deformed, and the latching portions 432 disengage from the corresponding latching holes 148, thus the fan mount 30 can be pulled out of the receiving space 12, and the corresponding fan 50 is ready to be detached from the fan mount 30.

The present disclosure of the power supply assembly 100 has detachable fans 50, which can be conveniently serviced or replaced. Furthermore, using two fans 50 in the power supply assembly 100 is helpful in giving choices for a designer or a user. The two fans 50 may be individually or together used based on different requirements for cooling ability and noise intensity. The two fans 50 also can be used to achieve redundancy function.

Furthermore, two raised poles 442 may extend from inner sides of each pair of the two pairs of locating pieces 44 and 45. The raised poles 442 can engage in the mounting holes 52 of the corresponding fans 50 to help mounting the fans 50 to the corresponding fan mounts 30.

In other embodiments, the projections 146 may be omitted, and the first pieces 41 of the fan mounts 30 abut against the base of the receiving space 12.

In other embodiments, the receiving space 12 may be designed to fit only one fan, so that the projections 142 and 144, which is used for guiding and spacing fans, can be omitted.

In other embodiments, the receiving space 12 may be designed to receive three or more fans. If the receiving space 12 is designed to receive three fans, another column of projections parallel with the two columns of projections 142 and 144 may be added for spacing fans.

In other embodiments, the latching holes 148 of the main body 10 and the latching portions 432 of the fan mounts 30 may be exchanged with each other.

In other embodiments, each fan 50 may be mounted to only one bracket 40 and then mounted to the main body 10.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply assembly comprising:
   two brackets, wherein each of the brackets comprises a first piece, a second piece extending perpendicularly from the first piece, and an elastic member extending from an end of the second piece opposite to the first piece;
   a fan detachably mounted between the brackets; and
   a main body defining a receiving space bounded by two opposite mounting walls;
   wherein the brackets together with the fan are capable of being detachably mounted to the main body via being received in the receiving space and the elastic members engaging with the corresponding mounting walls.

2. The power supply assembly of claim 1, wherein a latching portion extends from the elastic member of each of the brackets, a latching hole is defined in each of the mounting walls, the latching portions are capable of engaging in the corresponding latching holes.

3. The power supply assembly of claim 2, wherein the latching portions are wedge-shaped.

4. The power supply assembly of claim 2, wherein the elastic member of each of the brackets is L-shaped, and includes a first part aligning with the corresponding second piece and a second part extending perpendicularly relative to the corresponding second piece.

5. The power supply assembly of claim 4, wherein the latching portion of each of the brackets is located at an outer side of the first part of the corresponding elastic member, the elastic member of each of the brackets defines a hole in the second part of the elastic member.

6. The power supply assembly of claim 1, wherein each of the brackets further comprises a first pair of locating pieces, and a second pair of locating pieces, wherein the first pair of locating pieces perpendicularly connect and sandwich the corresponding first piece and the corresponding second piece, the second pair of locating pieces extend perpendicularly from the corresponding second piece and are located at opposite sides of the corresponding elastic member.

7. The power supply assembly of claim 6, wherein the fan is rectangular-shaped, capable of being sandwiched between the first and second pairs of locating pieces, a mounting hole is defined in each corner of the fan, two raised poles extend from inner sides of each of the first and second pairs of locating pieces, the raised poles are capable of engaging in the corresponding mounting holes of the fan.

8. The power supply assembly of claim 1, wherein each of the mounting walls comprises a projection extending therefrom, to abut against a corresponding first piece of a corresponding bracket.

9. The power supply assembly of claim 1, wherein each of the mounting walls comprises two columns of projections extending therefrom, the two columns of projections are capable of guiding the brackets together with the fan to be received in the receiving space and sandwiching the brackets therebetween.

10. A power supply assembly comprising:
    four brackets, wherein each of the brackets comprises an elastic member;
    two fans each detachably mounted between per two of the brackets; and
    a main body defining a receiving space, wherein the receiving space comprises two opposite mounting walls;
    wherein each two of the brackets together with corresponding one of the fans sandwiched therebetween are capable of being detachably mounted to the main body via being received in the receiving space and the corresponding elastic members engaging with the mounting walls;
    wherein each of the mounting walls comprises a column of projections extending therefrom, when the brackets together with the corresponding fans are mounted to the main body, the column of projections spaces the fans.

11. The power supply assembly of claim 10, wherein each of the brackets is approximately n-shaped and comprises a first piece, a second piece extending perpendicularly from the first piece, and the elastic member extending from an end of the second piece opposite to the first piece, each of the elastic members is L-shaped.

12. The power supply assembly of claim 10, wherein the receiving space of the main body further comprises two air-through walls connected between corresponding sides of the mounting walls, configured for air passing therethrough, wherein two of the brackets sandwiching corresponding one of the fans are sandwiched between the column of projections and one of the air-through walls, and the other two of the brackets sandwiching the other one of the fans are sandwiched between the column of projections and the other one of the air-through walls.

13. A power supply assembly comprising:
    at least one bracket comprising an elastic member extending from an end of the at least one bracket;
    at least one fan detachably mounted to the at least one bracket; and
    a main body defining a receiving space, and the receiving space comprising at least one mounting wall;
    wherein the at least one bracket mounted to the at least one fan is capable of being detachably mounted to the main body via being received in the receiving space and the elastic member engaging with the at least one mounting wall;
    wherein the at least one bracket further comprises a first piece and a second piece perpendicularly extending from the first piece; the elastic member comprises a first part extending from and aligning with the second piece, and a second part perpendicularly extending from the first part.

14. The power supply assembly of claim 13, wherein the at least one bracket comprises one bracket, the at least one fan comprises one fan, and the at least one mounting wall comprises one mounting wall.

15. The power supply assembly of claim 13, wherein a latching portion extends from an outer side of the first part of the elastic member, a latching hole is defined in the at least mounting wall, when the elastic member engages with the at least one mounting wall, the latching portion engages in the latching hole.

16. The power supply assembly of claim 13, wherein the elastic member is L-shaped, and a hole is defined in the second part of the elastic member, for manipulation of urging the elastic member to be deformed.

* * * * *